G. CLENDANIEL & J. A. REPETTI.
Suspending and Detaching Forks.

No. 149,575. Patented April 14, 1874.

WITNESSES.
S. Van Riswick
Chas. F. Steele

By R. W. Steele & Son

INVENTORS.
Jos. A. Repetti
Geo. Clendaniel
ATTORNEYS.

AM. PHOTO-LITHOGRAPHIC Co. N.Y. (OSBORNE'S PROCESS.)

UNITED STATES PATENT OFFICE.

GEORGE CLENDANIEL AND JOSEPH A. REPETTI, OF WASHINGTON, DISTRICT OF COLUMBIA; SAID CLENDANIEL ASSIGNOR TO SAID REPETTI.

IMPROVEMENT IN SUSPENDING AND DETACHING FORKS.

Specification forming part of Letters Patent No. 149,575, dated April 14, 1874; application filed July 14, 1873.

*To all whom it may concern:*

Be it known that we, GEORGE CLENDANIEL, of the city of Washington, in the District of Columbia, and JOSEPH A. REPETTI, of the same place, have invented a new and useful device, herein called a "Suspending and Detaching Fork;" and we do hereby declare that the following is a full, clear, and exact description of the construction and use of the same, reference being had to the drawings making a part of this specification, and to the letters and figures of reference marked thereon.

Figure 1:
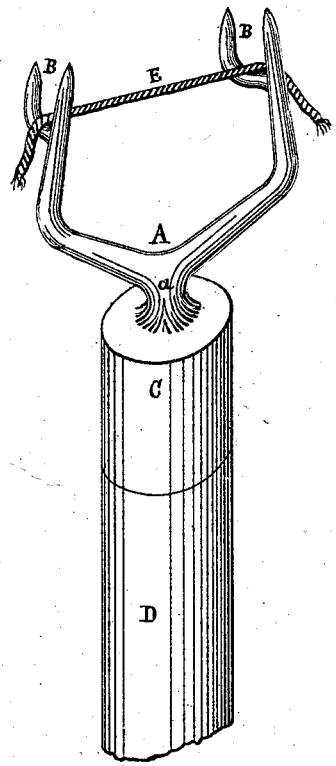
Figure 2:
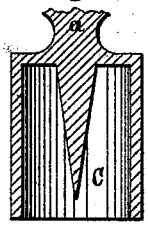

Figure 1 of the drawings is a perspective view of the device. Fig. 2 is a sectional view of the ferrule.

Our invention is a suspending and detaching fork; and consists in the novel construction and use of the same, for the purpose of putting any article in suspension—upon nails or hooks, or otherwise—beyond ordinary reach, and detaching the same at pleasure, and embraces the following peculiar features: A metallic two-tined fork, having on or near the extremity of each tine or prong a duplicated double hook or fork, and attached to the end of a staff or cane by means of a novel ferrule, the top of which in this device forms a portion or continuation of the shank of the aforesaid fork, all of which is hereinafter more fully described, and illustrated by the accompanying drawings, in which the same letters designate identical parts of the same device in the different figures, respectively.

The letter A represents a double-pronged fork, made of metal, either cast or wrought, of a shape similar or equivalent to the one shown by Fig. 1. On or near the extremity of each of said tines or prongs is formed, by casting, forging, or bending, a double hook or fork, B, as shown by Fig. 1, each of which is a duplicate of the other in shape and size, and at the same distance from the shank of the aforesaid fork A. The shank *a* continues and enlarges into the top of the ferrule C, by means of which the device is attached to the end of a cane or staff, D. This staff is of wood, and of any desired size and length.

We proceed to describe the mode of using our device, as follows: Whenever it is desired to hang any article, to which a ring or hook is attached, to or upon a nail or hook beyond ordinary reach, it is easily done by slipping the attaching ring or hook on either of the prongs of one of the double hooks B of the fork A, and, when the suspensory nail or hook is reached by the lifted and extended staff D, slipping it on said suspensory nail or hook, and leaving it to hang, as aforesaid; again, whenever a string or cord, E, is used to hold any article in suspension, said cord is strung within the prongs of both of the duplicate forks B, thus stretching it across from one to the other of said forks, as shown by Fig. 1; then lifted, as before, and the middle part of it placed upon the aforesaid suspensory nail or hook, and left to hang, as before described.

It is obvious that the very difficult and almost impossible feat of hanging up anything—such as a picture, for instance—by a string, upon a nail or hook beyond ordinary reach, because the loop, formed by stretching the cord over a single prong, horn, or hook of a suspending device, will tighten and stick to said device, when it is attempted to detach the same or draw it away, is rendered a very easy and quick one by our device.

The process of detaching any suspended article by means of our device, being, of course, the reverse of the above suspending process, readily suggests itself; therefore, Having fully described the construction and use of our device, what we claim as our invention, and desire to secure by Letters Patent, is—

A suspending and detaching fork, A, having duplicated forks B upon each of its tines, substantially as and for the purposes specified.

GEO. CLENDANIEL.
       JOS. A. REPETTI.

Witnesses:
 C. E. SIMMONS,
 I. P. DRIVER.